United States Patent [19]
Killick

[11] Patent Number: 5,049,192
[45] Date of Patent: Sep. 17, 1991

[54] CORN DRYING COMPOSITIONS

[75] Inventor: Robert W. Killick, Victoria, Australia

[73] Assignee: Victorian Chemical Co. Pty. Ltd., Victoria, Australia

[21] Appl. No.: 436,218

[22] Filed: Nov. 14, 1989

Related U.S. Application Data

[63] Continuation-in-part of Ser. No. 161,109, Feb. 26, 1988, abandoned.

[51] Int. Cl.$^5$ ................................................ C08L 91/00
[52] U.S. Cl. ..................................... 106/243; 426/302
[58] Field of Search ............... 106/243, 219; 426/302, 426/636, 640

[56] References Cited

U.S. PATENT DOCUMENTS

| | | |
|---|---|---|
| 4,606,844 | 8/1986 | Aguilera . |
| 4,692,265 | 9/1987 | Burghardi . |
| 4,707,289 | 11/1987 | Ramachandran . |
| 4,762,724 | 8/1988 | Staker et al. ........................ 426/302 |

OTHER PUBLICATIONS

Kats et al, Effect of oleic acid treatment on decreasing clumping of dried grapes (1983) Chem. Abstr. No. 98: 142127u.

Bolin et al: Fatty acid esters and carbonates in grape drying (1980) Chem. Abst. No. 93: 24729r.

*Primary Examiner*—William R. Dixon, Jr.
*Assistant Examiner*—Alan Wright
*Attorney, Agent, or Firm*—William H. Eilberg

[57] ABSTRACT

This invention provides a composition for use in the drying of corn. The composition permits the drying of corn at a significantly increased rate, as compared with prior art methods, or at the same rate but at lower drying temperatures. The composition includes a drying agent selected from the alkyl esters of mixed fatty acids, an emulsifier selected from the group of surface active agents which provide an oil in water emulsion of fatty esters in neutral and alkaline solutions, and a coupling agent to facilitate the homogenization of the alkyl ester and the emulsifier. A solution of the composition of the invention may be sprayed onto the corn, or the corn may be dipped into the solution.

14 Claims, No Drawings

CORN DRYING COMPOSITIONS

CROSS-REFERENCE TO PRIOR APPLICATION

This is a Continuation-in-Part of U.S. Patent Application Ser. No. 07/161,109, filed Feb. 26, 1988, entitled "Corn Drying Compositions".

FIELD OF THE INVENTION

The invention relates to materials for drying corn. The invention also relates to methods of producing such materials, and of applying such materials to the corn. The invention further relates to the optimization of the materials to minimize the drying time of the corn.

Corn is one of America's major items of produce. However, it does require drying before storage and ultimate sale and use. Many problems are associated with the drying step. These include the relatively high cost of drying which has been estimated as twenty percent of America's farm fuel bill; the length of drying time; the mold and hot spots which occur when the corn is improperly dried; the stress cracks in the corn kernel from overheating which cause large quantities of broken kernels and foreign materials.

SUMMARY OF THE INVENTION

This invention provides a composition which substantially reduces the disadvantages discussed above. The materials permit drying of corn at a significantly increased rate or at the same rate but at lower drying temperatures. The invention also provides the means whereby other workers can obtain the same effect.

Accordingly, there is provided a composition for use in the drying of corn comprising, in combination (i) a drying agent comprising at least 65% of the total composition, the drying agent being selected singly or mixed from the alkyl esters of mixed fatty acids, the drying agent having a level of unsaturated fatty acids of at least 35%;

(ii) an emulsifier comprising between 10-30% of the total composition, the emulsifier being selected singly or mixed from the group consisting of neutralized sulfated fatty acids and their alkyl esters, the emulsifier having a level of unsaturation before sulfation of at least 70%; and (iii) a coupling agent which will facilitate the homogenization of the alkyl ester and the emulsifier, the coupling agent being distinct from the drying agent.

The drying agent which provides a fatty ester oil is typically derived from either the natural oils and fats or synthetic fatty acids. The drying agent absorbs into the waxy cuticle of the corn surface and the softened surface permits rapid transfer of moisture from the corn kernel. Preferably, the drying agent is selected from a group consisting of the lower chain (1 to 4 carbon atoms) alkyl esters of mixed fatty acids.

In determining the quantity of fatty acid ester to be added to the corn, it should be noted that a sufficient amount of fatty acid ester is required to penetrate the skin or membrane of the corn. In addition, the fatty acid ester is required to be in solution with the emulsifier. Given the high cost of the emulsifier, a fine balance has to be made between the quantities used of the fatty acid ester and the emulsifier. It is for these reasons that a maximum of 65-70% of fatty acid ester in the corn drying composition is selected.

The emulsifier may be any known to those skilled in the art, which will provide the desired oil in water emulsion of fatty esters in neutral or alkaline solutions. The emulsifier may also be a drying agent especially if selected from a preferred group consisting of the nonionic monoglycerides or the anionic sulfated oleate fatty acid or its esters or the condensed fatty acids with amines such as diethanolamine.

The coupling agent may be any known to those skilled in the art which will facilitate the homogenization of the fatty ester and the emulsifying agent. The coupling agent can also act as a drying agent, especially if selected from a preferred group consisting of the liquid fatty acids. However the coupling agent must be distinct from the drying agent.

For those skilled in the art these fatty ester oils, emulsifiers and coupling agents are blended together to form a homogeneous oil blend and which is described as such through this specification.

DETAILED DESCRIPTION OF THE INVENTION

In one embodiment of the invention, the oil blend preferably contains as drying agent, ethyl esters of mixed fatty acids which have a minimum oleate level of 35%. The higher levels of ethyl oleate provide a more readily absorbed ester into the wax on the corn surface. It is also preferable to have the combined maximum level of polyunsaturated fatty acids (e.g. linoleate and linolenate) of 30% which minimizes any potential off odors at a later date.

There are innumerable variations since the ethyl esters of mixed fatty acids may be produced from the natural oils and fats such as coconut, lard, tallow and vegetable oils or from specific blends manufactured by fatty acid manufacturers or from fatty acids made by synthetic means.

The ethyl esters of mixed fatty acids are desirable but may be replaced by other fatty acid esters such as methyl, propyl, iso-propyl, butyl, and iso-butyl.

Preferably, the emulsifier is sodium neutralized sulfated butyl oleate and may have a typical $SO_3$ content of 4% (on a dry basis). It is also preferred that the unsaturated fatty esters have a minimum 70% content before sulfation. The oleate name does not preclude the presence of other fatty materials such as linoleate and linolenate esters.

Other alkaline materials may be used in the neutralization such as ammonia, potassium and amines such as triethanolamine. Sodium neutralized sulfated butyl oleate is desirable but may be replaced in whole or part by the neutralized sulfated methyl, ethyl, propyl, iso-propyl and iso-butyl oleates. The oleate moiety refers to the generic predominantly unsaturated fatty acids as commercially available.

Preferably, the coupling agent is oleic acid. It is understood that this is the material which is commercially available and which normally contained between 50% to 80% of octadecanoic acid ($C_{10}H_{34}O_2$) but does not preclude the fractionated material of higher percentage contents of oleic acid.

The composition of this invention may also include a drying agent alkali providing a basic pH in an aqueous solution of at least 10.0. The drying agent alkali has properties of reacting with the acidic moities on the surface of the corn and facilitating the absorption of the other drying agent into the waxy cuticle of the corn. The drying agent alkali is selected from a group consisting of the carbonates, phosphates and silicates of at least one of sodium and potassium and a combination of the hydroxides, carbonates and bicarbonates of at least one of sodium and potassium.

Typically the composition of the present invention is applied to the corn in a concentration of approximately four (4) pounds to nine (9) pounds per ton of dried corn. The concentration of the ingredients of the composition is dependent upon the relative amount of moisture on and in the corn to be dried and can be gained by experience in the field.

Preferably the drying agent alkali such as potassium carbonate has a pH of about 11.5-12.0 in the solution. The value of this pH is effective in neutralizing the acidic moities on the surface of the corn. This changes the surface of the corn to facilitate the drying. As will be appreciated, excess of the emulsion is added and drained away so no excess occurs but that necessary for neutralization.

Potassium carbonate is desirable because it may be contacted and ingested safely by human beings and animals. Other materials may also be safely used as drying agent alkalis. For example part of the potassium carbonate may be replaced by sodium carbonate ($Na_2CO_3$) or sodium bicarbonate ($NaHCO_3$) (up to 90% by weight) or sodium hydroxide (NaOH) (10% by weight). Sodium metasilicate ($Na_2SiO_3$), sodium orthosilicate ($Na_3SiO_4$) and trisodium phosphate ($Na_3PO_4$) may also be used.

The materials may be applied to the corn in several ways. The following two ways which are suggested are not limiting to the scope of the invention.

In the first instance, the oil blend of fatty ester oil and emulsifiers is stirred into water with or without the presence of the coupling agent or the drying agent alkali and this emulsion is sprayed onto the corn either during the harvest, where thorough dispersion throughout the corn takes place and/or at the appropriate point before the drying chamber. It is possible to spray directly into the drying area if the appropriate facilities are available for removal of excess fluid.

In the second instance, the coupled emulsified fatty ester oil blend is stirred into water with or without the presence of the drying alkali and into this emulsion the corn is dipped for the necessary length of time.

The corn is preferably dried by air at temperatures below about 120° F., above which temperature stress fracture of the corn occurs.

Experience has shown that when the corn is dipped in aqueous emulsion containing 2.3% potassium carbonate and 1.5% of the oil blend containing 45% methyl ester of sunflower oil, 20% ethyl ester of lard, 20% sodium neutralized sulfated butyl oleate, 10% soda neutralized sulfated ethyl oleate, and 5% water for 45 seconds, it may be dried at 100° F. in the same time as when temperatures in excess of 130° F. are used.

In another example corn is sprayed by an aqueous emulsion containing 1.6% of the alkaline mixture containing 50% potassium carbonate, 35% sodium carbonate and 15% sodium metasilicate and 1.0% of the oil blend containing 50% methyl ester of lard, 40% methyl ester of coconut oil, 5% sodium neutralized sulfated butyl oleate and 5% glyceryl mono-oleate. Corn at 22% moisture was dried down to 15% in three quarters of the time taken by control samples.

In a further example, an aqueous emulsion containing 1% of an alkaline mixture containing 45% potassium carbonate, 45% sodium carbonate and 10% sodium metasilicate and 0.7% of the oil blend containing 75% ethyl ester of vegetable oil, 15% ammonium neutralized sulfated butyl oleate, 5% oleic acid and 5% of the condensed product of oleic acid and diethanolamine is sprayed onto corn in the combine at harvest. The corn leaves the farm at 2% BCFM (broken kernels and foreign materials) and following treatment, drying, and transport has a BCFM of around 8% against traditional figures of 13% BCFM.

In another example, an aqueous emulsion of 1.6% of the oil blend of 70% ethyl ester of tallow, 13.5% sodium neutralized sulfated butyl oleate, 8% sodium neutralized sulfated ethyl oleate, 5% oleic acid and 3.5% water was sprayed onto the corn before the drying chamber. By utilizing an air drying temperature of 95° F. the corn dried approximately 5% more quickly than when temperatures of 125° F. are used.

The effectiveness of the compositions of the invention have been the subject of a series of trials conducted at several universities in the mid-west of the United States of America. The following compositions were assessed where the compositions differed in the use of fatty acid esters from tallow (A) as opposed to vegetable oil (B):

|  | Composition A | Composition B |
| --- | --- | --- |
| Ethyl tallowate | 65 | — |
| Ethyl oleate | — | 65 |
| Sulphonated butyl oleate | 18 | 18 |
| Sulphonated ethyl oleate | 8 | 8 |
| Potassium oleate | 4 | 4 |
| Water | to 100 | to 100 |

In compositions A and B, the coupling agent is potassium oleate, the fatty acid ester is either ethyl tallowate or ethyl oleate, and the emulsifier is either sulphonated butyl oleate or sulphonated ethyl oleate.

As the Iowa State University, ten liters of emulsion were mixed with one ton of corn. Within the total of ten (10) liter of emulsion, 0.25, 1.0 and 4.0 liters of compositions A or B (as the case may be) were incorporated. The corn was dried at 145° F. (62.8° C.) with a total air flow of 6.23 m$^3$/min (220 ft$^3$/min) and an air velocity of 0.447 m/sec (88 ft/min).

| Amount (in liters) of compositions A or B in ten liters of emulsion | Moisture (%) after 20 minutes | |
| --- | --- | --- |
|  | Composition A | Composition B |
| No liquid | 14.5 | 14.5 |
| 0 | 14.5 | 14.5 |
| 0.25 | 14.4 | 14.0 |
| 1.0 | 12.4 | 13.1 |
| 4.0 | 13.6 | 12.2 |

| Amount (in liters) of compositions A or B in ten liters of emulsion | Time (mins) to reach 14.5% moisture | |
| --- | --- | --- |
|  | Composition A | Composition B |
| No liquid | 120 | 120 |
| 0 | 120 | 120 |
| 0.25 | 119 | 115 |
| 1.0 | 100 | 107 |
| 4.0 | 111 | 96 |

In the above tables, and in similar tables presented below, the term "no liquid" means that the test was performed on the corn in the state in which it is received. The second lien of the table (in which the amount of composition is "zero") refers to the case where water is present, but where neither composition A nor B is present.

The above tables show that the results obtained by using either composition A or composition B are more favorable than the results obtained without either such composition (compare the results with those obtained for zero amount of composition A or B0.

From these results, it can also be seen that, while both compositions allow for the effective drying of corn, composition B, with a higher oleate content, as opposed to that from tallow, provides a lower moisture percentage after twenty (20) minutes. Similarly, the results indicate that by using the claimed compositions, the time required to achieve 14.5% moisture was less than by using an emulsion with none of the claimed compositions. In addition, by use of the higher oleate content fatty acid ester, the time required to achieve a certain percentage of moisture was lower than the time required when using a composition containing the fatty acid ester from tallow.

At Clemson University, 11 liters of emulsion were mixed with one ton of Yellow Dent corn. Within the total of 11 liters, 0.275, 0.55, 1.1, 2.2, and 4.4 liters of compositions A or B (as the case may be) were incorporated. The corn was dried at 120° F., 18% relative humidity, with a total air flow of 2-3 ft³/min. The results achieved were as follows:

| Amount (in liters) of compositions A or B in ten liters of emulsion | Moisture (%) after 20 minutes | |
|---|---|---|
| | Composition A | Composition B |
| No liquid | 19.8 | 19.8 |
| 0 | 18.7 | 18.7 |
| 0.275 | 16.1 | 17.1 |
| 0.55 | 16.5 | 16.7 |
| 1.1 | 16.3 | 15.3 |
| 2.2 | 16.5 | 15.8 |
| 4.4 | 14.7 | 15.4 |

Once again, while both compositions result in the significant reduction of moisture in the corn, the general trend is that the moisture (%) content after twenty minutes of drying the corn is reduced by using the composition of the higher oleate content of the mixed fatty acid from vegetable oil rather than by using the composition from tallow.

The data were also analyzed into a modified thin layer drying equation of the form $$Y = B1 e^{(-t/B2)} + B3,$$

where Y is moisture content (dry basis), t is time in the drier, B1 is the drying coefficient, B2 is the drying rate constant, and B3 the intercept. The results are shown in the following table, with lower numbers providing the faster drying.

| Quantity (in liters) of compositions A or B (as the case may be) in ten liters of emulsion | B2 - Driving Rate Constant (120° F., 18% R.H.) | |
|---|---|---|
| | Composition A | Composition B |
| No liquid | 276 | 276 |
| 0 | 266 | 266 |
| 0.275 | 161 | 203 |
| 0.55 | 156 | 181 |
| 1.1 | 150 | 154 |
| 2.2 | 168 | 156 |
| 4.4 | 137 | 148 |

Once again, lower numbers are achieved using compositions of fatty acid esters rather than using no fatty acid esters, and over all the compositions, using the oleate as opposed to the tallowate as the mixed fatty acid ester provided better results.

At the University of Illinois, 10 liters of emulsion were mixed with 2000 lb of corn (11.0 ml/kg). Within the total of 11.0 ml, 0.25, 1.0, and 4.0 ml of compositions A or B (as the case may be) were incorporated. The corn was dried at 120° F., while the air velocity was not quoted. The drying rates (g/kg-min × 1000) are shown in the table below, with larger numbers providing the faster drying.

| Quantity (in ml) of compositions A or B (as the case may be) in 11.0 ml of emulsion | Drying Rate Constants (g/kg - min × 1000) | |
|---|---|---|
| | Composition A | Composition B |
| No liquid | 512 | 506 |
| 0 | 537 | 595 |
| 0.25 | 558 | 623 |
| 1.0 | 570 | 626 |
| 4.0 | 580 | 638 |

It is believed that the reason why the results obtained in the first and second lines of the table (for zero amounts of compositions A or B) are different is because the tests for the two compositions were done separately on different days.

From these results, the trend is that use of both compositions result in large numbers, which are indicative of faster drying, but use of the mixed fatty acid ester from vegetable oil gave faster drying.

At the University of Missouri, 11 liters of emulsion were mixed with 1000 kg of corn. Within the total of 11 liters of the emulsion, 0.275, 0.55, 1.1, 2.2, and 4.4 liters of compositions A or B (as the case may be) were incorporated. The corn was dried at 40° C. with an air flow rate of 63.4 m³/min. A Duncan Multiple Range Test was carried out after 4 hours and is shown below. (Note that the moisture means with the same letters are not significantly different.)

The Duncan Multiple Range Test groups compositions producing like results with the same letter of the alphabet. Accordingly, those mixtures of compositions which, when tested, result in varying letters of the alphabet are preferred compositions.

| Duncan Grouping | | | | Mean | Duncan Grouping Table Mean Moisture Content % after 4 hrs. | |
|---|---|---|---|---|---|---|
| | | | | | Composition A | Composition B |
| | | A | | 12.315 | | |
| | | A | | 12.200 | | |
| | | B | | 11.047 | 2.5 | |
| | | C | | 10.810 | 5.0 | |
| | | C | | 10.810 | 10.0 | |
| D | | C | | 10.682 | 20.0 | |
| D | | C | E | 10.595 | 40.0 | |
| D | G | F | E | 10.467 | | 10.0 |
| H | G | F | E | 10.390 | | 2.5 |

-continued

| Duncan Grouping | | | | Mean | Duncan Grouping Table Mean Moisture Content % after 4 hrs. | |
|---|---|---|---|---|---|---|
| | | | | | Composition A | Composition B |
| H | G | F | E | 10.350 | | 5.0 |
| H | G | | | 10.223 | | 20.0 |
| H | | | | 10.185 | | 40.0 |

This pattern of superiority towards composition B is maintained through the drying periods.

Modification to and variations of the invention will be readily apparent to those skilled in the art. These are intended to be encompassed within the scope of the invention.

What is claimed is:

1. A composition for use in the drying of corn, consisting essentially of, in combination:
   (i) a drying agent comprising at least about 65% of the total composition, the drying agent being selected singly or mixed from the alkyl esters of mixed fatty acids, the drying agent having a level of unsaturated fatty acids of at least 35%,
   (ii) an emulsifier comprising between about 10–30% of the total composition, the emulsifier being selected singly or mixed from the group consisting of neutralized sulfated fatty acids and their alkyl esters, the emulsifier having a level of unsaturated before sulfation of at least about 70%, and
   (iii) a coupling agent which will facilitate the homogenization of the drying agent and the emulsifier, the coupling agent being distinct from the drying agent.

2. The composition of claim 1, wherein the alkyl ester of mixed fatty acids is the ethyl ester of mixed fatty acids.

3. The composition of claim 2 wherein the mixed fatty acids of the ethyl ester of mixed fatty acids have a maximum of 30% polyunsaturated fatty acids.

4. The composition of claim 1, wherein the emulsifier is sodium sulfated butyl oleate.

5. The composition of claim 4, wherein the sulfated butyl oleate has a typical $SO_3$ content of 4% (dry weight) after sulfation.

6. A composition for use in the drying of corn, consisting essentially of an aqueous emulsion of 1.6% of the oil blend of 70% ethyl tallowate, 13.5% sodium neutralized sulfated butyl oleate, 8% sodium neutralized sulfated ethyl oleate, 5% oleic acid, and 3.5% water.

7. A method of preparing corn for drying, the method comprising the steps of:
   (a) forming a composition consisting essentially of a drying agent selected from the alkyl esters of mixed fatty acids, an emulsifier selected from the group of surface active agents which provide an oil in water emulsion of fatty esters in neutral and alkaline solutions, and a coupling agent which will facilitate the homogenization of the drying agent and the emulsifier, the coupling agent being distinct from the drying agent, and
   (b) applying said composition to the corn prior to drying.

8. The method of claim 7, wherein the composition is applied in a concentration of approximately 4–9 pounds per ton of dried corn.

9. The method of claim 7, wherein the composition is sprayed onto the corn.

10. The method of claim 7, wherein the corn is dipped in the composition.

11. The method of claim 9, further comprising the step of drying the corn by air having a temperature below about 120° F.

12. The method of claim 11, wherein the corn is dried by air having a temperature of about 95° F.

13. The method of claim 11, wherein the corn is dried by air having a temperature of about 100° F.

14. A composition for use in the drying of corn, consisting essentially of, in combination:
   (i) a drying agent comprising at least about 65% of the total composition, the drying agent being selected singly or mixed from the alkyl esters of mixed fatty acids, the drying agent having a level of unsaturated fatty acids of at least 35%,
   (ii) an emulsifier comprising between about 10–30% of the total composition, the emulsifier being selected singly or mixed from the group consisting of neutralized sulfated fatty acids and their alkyl esters, the emulsifier having a level of unsaturation before sulfation of at least about 70%,
   (iii) a coupling agent which will facilitate the homogenization of the drying agent and the emulsifier, the coupling agent being distinct from the drying agent, and
   (iv) a drying agent alkali providing a basic pH in the composition.

* * * * *